(12) United States Patent
Jones et al.

(10) Patent No.: US 12,515,522 B2
(45) Date of Patent: Jan. 6, 2026

(54) DEVICE, SYSTEM, AND METHOD FOR CONTROLLING A VEHICLE-RELATED DISPLAY INTO AN EXITED OCCUPANT SUPPORT MODE

(71) Applicant: MOTOROLA SOLUTIONS, INC., Chicago, IL (US)

(72) Inventors: Stephanie E. Jones, Marietta, GA (US); Daniel R. Bestor, Schaumburg, IL (US); Peter L. Venetianer, McLean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 137 days.

(21) Appl. No.: 18/374,841

(22) Filed: Sep. 29, 2023

(65) Prior Publication Data
US 2025/0108689 A1  Apr. 3, 2025

(51) Int. Cl.
*B60K 35/28* (2024.01)
*B60K 35/65* (2024.01)
*B60K 35/80* (2024.01)
*B60K 35/85* (2024.01)

(52) U.S. Cl.
CPC .............. *B60K 35/28* (2024.01); *B60K 35/65* (2024.01); *B60K 35/80* (2024.01); *B60K 35/85* (2024.01); *B60K 2360/16* (2024.01); *B60K 2360/577* (2024.01); *B60K 2360/589* (2024.01); *B60K 2360/592* (2024.01); *B60K 2360/741* (2024.01)

(58) Field of Classification Search
CPC .......... B60K 2360/16; B60K 2360/577; B60K 2360/589; B60K 2360/59; B60K 2360/741; B60K 35/00; B60K 35/28; B60K 35/65; B60K 35/80; B60K 35/85
See application file for complete search history.

(56) References Cited

U.S. PATENT DOCUMENTS

| 8,718,797 | B1 | 5/2014 | Addepalli et al. |
| 9,340,155 | B2 | 5/2016 | Pisz et al. |
| 9,387,824 | B2 | 7/2016 | Pisz et al. |
| 11,562,550 | B1 | 1/2023 | Asghar et al. |
| 11,950,017 | B2 * | 4/2024 | Han ........................ H04N 7/188 |

(Continued)

FOREIGN PATENT DOCUMENTS

KR   20210011416 A   2/2021

OTHER PUBLICATIONS https://iot.ilifesmart.com/smart-sensor/human-presence-sensor.html—downloaded on Sep. 19, 2023.

*Primary Examiner* — Aniss Chad
(74) *Attorney, Agent, or Firm* — PERRY + CURRIER INC. (FOR MSI)

(57) ABSTRACT

A device, system, and method for controlling a vehicle-related display into an exited occupant support mode is provided. A system comprises: a vehicle egress sensor; a first vehicle comprising: a vehicle display; a mobile device comprising: a mobile display, the first vehicle and the mobile device communicatively coupled to each other; and a controller. The controller is configured to: determine, via the vehicle egress sensor, that an occupant has exited the first vehicle, or a second vehicle proximal to the first vehicle; and in response, selectively enable an exited occupant support mode at one or more of the vehicle display and the mobile display.

20 Claims, 5 Drawing Sheets

(56) References Cited

U.S. PATENT DOCUMENTS

| | | |
|---|---|---|
| 11,950,316 B1* | 4/2024 | Nalevanko .............. H04W 4/40 |
| 11,999,232 B2* | 6/2024 | Salter ..................... B60K 35/28 |
| 2014/0309868 A1 | 10/2014 | Ricci |
| 2018/0072263 A1* | 3/2018 | Green ................. B60R 21/0136 |
| 2020/0094845 A1* | 3/2020 | Shiga .................... B60W 40/09 |
| 2022/0163371 A1 | 5/2022 | Aina et al. |
| 2022/0171382 A1 | 6/2022 | Austria et al. |
| 2022/0185113 A1* | 6/2022 | Nix ........................ B60K 35/00 |
| 2022/0379908 A1* | 12/2022 | Suzuki ...................... B60R 1/26 |
| 2023/0356728 A1* | 11/2023 | Jain ........................ G06F 3/013 |
| 2024/0124007 A1* | 4/2024 | Hawley ..................... G06T 7/70 |

* cited by examiner

DEVICE, SYSTEM, AND METHOD FOR CONTROLLING A VEHICLE-RELATED DISPLAY INTO AN EXITED OCCUPANT SUPPORT MODE

BACKGROUND OF THE INVENTION

In first responder environments, functionality provided at vehicles may be important for first responders to manage an incident. Such functionality may be provided at a respective mobile device display and/or a respective vehicle display of the vehicles, however such displays tend to mirror each other, which may be a waste of processing resources, bandwidth resources, a waste of display space and/or an opportunity to add additional useful functionality.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
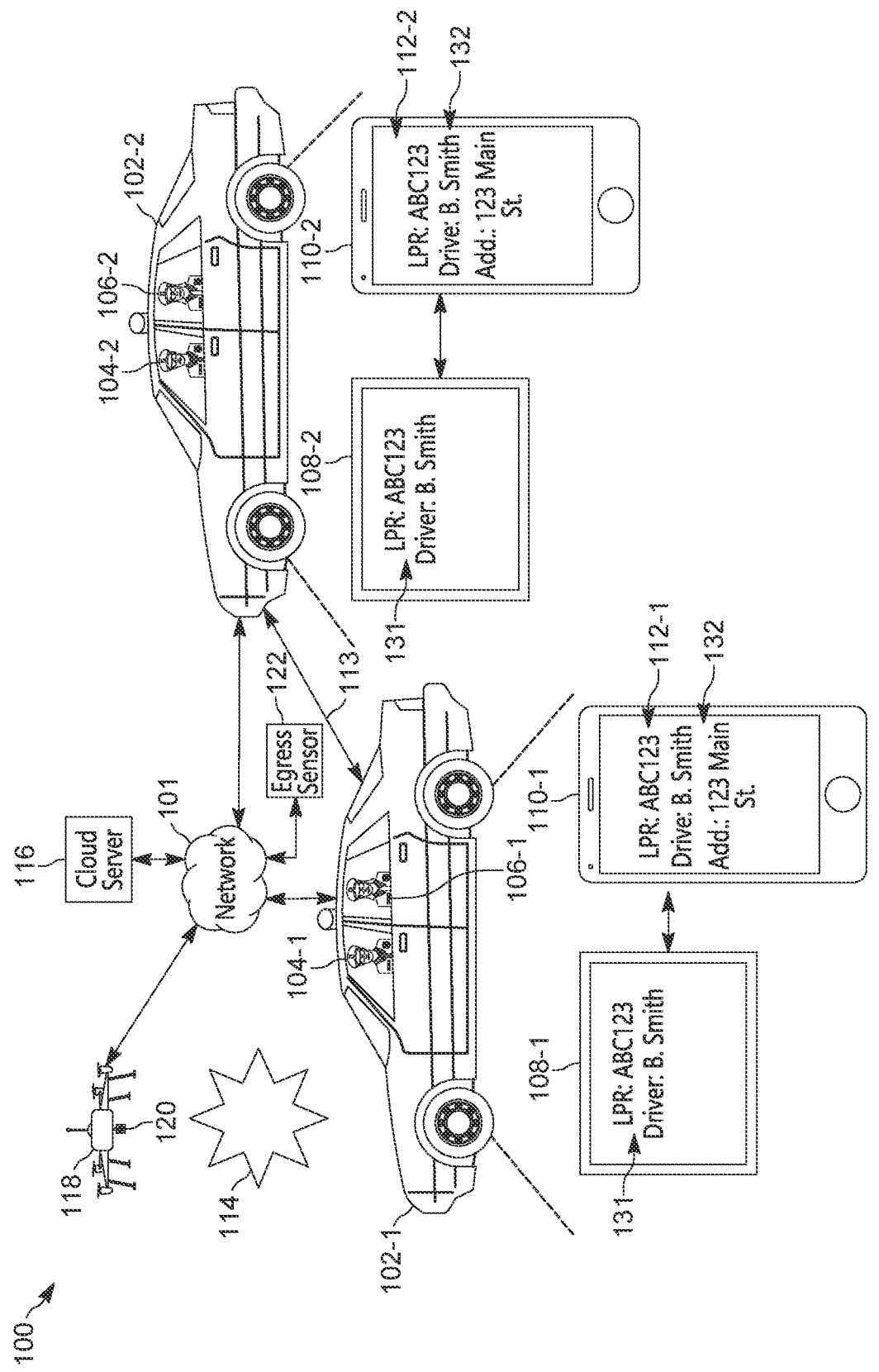
FIG. 1 depicts a system for controlling a vehicle-related display into an exited occupant support mode, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In first responder environments, functionality provided at vehicle-related displays may be important for first responders. When a first responder exits a vehicle, special technical support may be required for the first responder, whether the first responder is managing an incident, or whether the first responder is performing a routine patrol. Such functionality may be provided at a mobile device display and/or a vehicle display, however such displays tend to mirror each other, which may be a waste of processing resources, bandwidth resources, a waste of display space and/or an opportunity to add additional useful functionality and/or which may not provide adequate support for the first responder that exited the vehicle. For example, in applications such as Apple CarPlay™ or Android Auto™, a mobile device may control a vehicle display, but such control is limited. Thus, there exists a need for an improved technical method, device, and system for controlling a vehicle-related display into an exited occupant support mode.

Hence, provided herein is a device, system, and method for controlling a vehicle-related display into an exited occupant support mode. The system comprises at least a first vehicle (e.g., a police car, a fire truck, an ambulance, a security guard vehicle, amongst other possibilities, and the like), and the first vehicle generally comprises a vehicle display. The system further comprises a mobile device that includes a mobile display, which may be located in the first vehicle, and/or which may be carried outside the first vehicle. Regardless, the first vehicle and the mobile device are communicatively coupled to each other.

The system further comprises a vehicle egress sensor, which may generally detect whether an occupant has exited the first vehicle, or a second vehicle proximal to the first vehicle. The vehicle egress sensor may comprise one or more of a door sensor of the first vehicle or the second vehicle, a video camera, a location sensor configured to sense a location of the occupant that exited the of the first vehicle or the second vehicle, a presence sensor, an occupant-vehicle communication device, and the like, amongst other possibilities.

The system further comprises a controller (e.g., such as a processor, and the like), which may be a component of the first vehicle and/or the mobile device. The controller is generally configured to determine, via the vehicle egress sensor, that an occupant has exited the first vehicle, or the second vehicle proximal to the first vehicle.

In response to determining that an occupant has exited the first vehicle, or the second vehicle proximal to the first vehicle, the controller selectively enables an exited occupant support mode at one or more of the vehicle display and the mobile display.

Hence, in some examples, one or more of a vehicle display and a mobile display of a vehicle may be placed into the exited occupant support mode when an occupant of the vehicle exits the vehicle. Such a situation may occur when two first responders (e.g., two police officers) are in a vehicle (e.g., a police car), and one of the first responders exits the vehicle. The controller determines that one of the first responders has exited the vehicle via the vehicle egress sensor, and responsively places one or more of the vehicle display and the mobile display into the exited occupant support mode, in which, for example, respective applications are selectively enabled at one or more of the vehicle display and the mobile display that support the exited first responder. Such applications may include, for example, a body worn camera output application that provides streamed video of a body worn camera worn by the exited first responder, a vital sign application providing vital signs, and/or other biometric data, of the exited first responder as detected by, and received from, a biometric monitor worn by the exited first responder, a drone control application for controlling a drone launched to assist the exited first responder, and the like.

Alternatively, or in addition, one or more of a vehicle display and a mobile display of a first vehicle may be placed into the exited occupant support mode when an occupant of a second vehicle, proximal to the first vehicle, exits the second vehicle. Such a situation may occur when first responders (e.g., police officers) are in different vehicles (e.g., police cars) proximal to each other (e.g. within a given distance), and one of the first responders exits one of the vehicles. In the example of a first vehicle and second vehicle, the controller determines, via the vehicle egress sensor, that a first responder has exited the second vehicle, and responsively places one or more of the vehicle display and the mobile display of the first vehicle into the exited occupant support mode, in which, for example, respective applications (e.g. as previously described) are selectively enabled one or more of the vehicle display and the mobile display that support the exited first responder of the second vehicle.

Alternatively, or in addition, rather than selectively enable applications in the exited occupant support mode, the controller may selectively enable an exited occupant support mode of one current applications enabled at one or more of the vehicle display and the mobile display, for example from a current mode to the exited occupant support mode, where, in the exited occupant support mode, the current applications are in a mode that better supports an exited first responder, relative to the first mode.

Such selective enablement of applications, and/or modes, may be to ensure that functionality provided when an occupant exits a vehicle is provided in a manner that uses processing resources and/or bandwidth resources more effectively and/or so as not to duplicate processing at the displays of a vehicle at the incident scene, and/or to add additional useful functionality to assist the vehicle, and an associated mobile device, and an occupant owner operator, in cooperating in a manner that may enable an incident at the incident scene to be more quickly managed and/or resolved. In particular, from a point of view of an occupant owner operator, such selective enablement of applications, and/or modes, may assist in resolving an incident at the incident scene faster and/or better than if such selective enablement of applications and/or modes did not occur. Indeed, such selective enablement of applications, and/or modes, may cause the vehicle display and/or the mobile display to provide information and/or functionality that is most relevant for occupant owner operator remaining in a vehicle, which may be achieved by providing different information and/or different functionality at the displays. It is further understood however, that such selective enablement of applications, and/or modes may generally optimize use processing resources and/or bandwidth, for example, by using a controller of one of a mobile device or a vehicle computing device for selective enablement of applications, and/or modes and centrally controlling such selective enablement of applications, and/or modes.

An aspect of the present specification provides a system comprising: a vehicle egress sensor; a first vehicle comprising: a vehicle display; a mobile device comprising: a mobile display, the first vehicle and the mobile device communicatively coupled to each other; and at least one controller configured to: determine, via the vehicle egress sensor, that an occupant has exited the first vehicle, or a second vehicle proximal to the first vehicle; and in response, selectively enable an exited occupant support mode at one or more of the vehicle display and the mobile display.

Another aspect of the present specification provides a method comprising: determining, at a computing device, via a vehicle egress sensor, that an occupant has exited a first vehicle, or a second vehicle proximal to the first vehicle, a vehicle egress sensor; the first vehicle comprising: a vehicle display; and a mobile device comprising: a mobile display, the first vehicle and the mobile device communicatively coupled to each other; and in response, selectively enabling, via the computing device, an exited occupant support mode at one or more of the vehicle display and the mobile display.

Each of the above-mentioned aspects will be discussed in more detail below, starting with an example system and device architectures of the system, in which the embodiments may be practiced, followed by an illustration of processing blocks for achieving an improved technical method, device, and system for controlling a vehicle-related display into an exited occupant support mode.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and, likewise, various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus, provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for controlling a vehicle-related display into an exited occupant support mode. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks 101, or the like.

The system 100 comprises a first vehicle 102-1 and a second vehicle 102-2, interchangeably referred to hereafter, collectively, as the vehicles 102 and, generically, as a vehicle 102. This convention will be used throughout the present application.

As depicted, the first vehicle 102-1 is occupied by a first occupant 104-1 and a second occupant 106-1, and the second vehicle 102-2 is occupied by a respective first occupant 104-2 and a respective second occupant 106-2. The first occupants 104-1, 104-2, are interchangeably referred to hereafter, collectively, as the first occupants 104 and, generically, as a first occupant 104. Similarly, the second occupants 106-1, 106-2, are interchangeably referred to hereafter, collectively, as the second occupants 106 and, generically, as a second occupant 106.

As will be presently explained, while the first occupants 104 are presently in their respective vehicles 102, one the first occupants 104 may later exit a respective vehicle 102, and hence one or more of the first occupants is later referred to as an exited occupant 104; a remaining first occupant 104 is later referred to as remaining occupant 104. Similarly, when a first occupant 104 exits a respective vehicle 102, the second occupants 106 remain in their respective vehicles 102, and hence are later referred to as remaining occupants 106.

As depicted, the vehicles 102 may comprise police vehicles, and the occupants 104, 106 may comprise police officers. However, the vehicles 102 may comprise any suitable vehicle, such as a first responder vehicle, and the like (e.g., police cars, fire trucks, ambulances, security guard vehicles, amongst other possibilities). While not depicted, a vehicle 102 may comprise any suitable combination of hardware that may depend on a type of a vehicle 102. For example, when a vehicle 102 is a police vehicle, the vehicle 102 may comprise any suitable combination of a license plate reader (LPR), cameras (e.g., dashboard cameras), radios, and the like.

Similarly, the occupants 104, 106 may comprise any suitable occupants, such as any suitable first responders, and the like (e.g., police officers, fire fighters, emergency medical technicians, security guards, amongst other possibilities). While a pair of occupants 104, 106 is depicted at both vehicles 102, a vehicle 102 may include as few as one first occupant 104, such as a driver and no passenger, and as many as three to five, or more occupants.

As indicated via respective broken lines extending from respective vehicles 102, to show details of a dashboard of a respective vehicle 102, a vehicle 102 may comprise a respective vehicle display 108-1, 108-2 (e.g., vehicle displays 108 and/or a vehicle display 108), which may also be referred to as a first vehicle display 108-1 and a second vehicle display 108-2.

Furthermore, the system 100 generally comprises mobile devices 110-1, 110-2 (e.g., mobile device 110 and/or a mobile device 110), and the mobile devices 110-1, 110-2 comprise respective mobile displays 112-1, 112-2 (e.g., mobile displays 112 and/or a mobile display 112). The mobile devices 110-1, 110-2 may also be referred to as a first mobile device 110-1 and a second mobile device 110-2, and the mobile displays 112-1, 112-2 may also be referred to as a first mobile display 112-2 and a second mobile display 112-2.

In general, a vehicle display 108 comprises a display screen of a vehicle 102, and a mobile display 112 comprises a mobile display screen of a mobile device 110, and such display screens may be any suitable type of display screens (e.g., liquid crystal displays (LCDs), organic light emitting displays (OLEDs), and the like, amongst other possibilities). One or more of a vehicle display 108 and a mobile display 112 may comprise a touchscreen with an integrated input mechanism (e.g., a touch sensitive surface, and the like, and/or one or more of a vehicle display 108 and a mobile display 112 may comprise a non-touch display with a separate input mechanism (e.g., a mouse, a touchpad, a keyboard, and the like).

In general, a vehicle 102 and a respective mobile device 110 are communicatively coupled to each other, for example as indicated by a double-ended arrow between the mobile devices 110 and a respective vehicle display 108, representing a communication link therebetween. While such double-ended arrows are depicted as between the mobile devices 110 and a respective vehicle display 108 it is understood that communication between a mobile device 110 and a vehicle 102 may be between a mobile device 110 and a vehicle computing device that manages a respective vehicle display 108.

In particular, the first vehicle 102-1 comprises the first vehicle display 108-1, and the first vehicle 102-1 and the first mobile device 110-1 are communicatively coupled to each other. Similarly, the second vehicle 102-2 comprises the second vehicle display 108-2, and the second vehicle 102-2 and the second mobile device 110-2 are communicatively coupled to each other.

Such communication may be via a wired communications link (e.g., a cable between a mobile device 110 and a vehicle 102, such as between respective universal serial bus (USB) ports at a mobile device 110 and a vehicle 102, or any other suitable wired link), or such communication may be via a wireless link (e.g., a Bluetooth™ wireless link and/or a near field communication (NFC) link, and the like, between a mobile device 110 and a vehicle 102, or any other suitable wireless link). Put another way, a vehicle 102 and a mobile device 110 may be associated by virtue of a vehicle 102 and a mobile device 110 being communicatively coupled to each other, and/or a vehicle display 108 and a mobile device 110 may be associated, for example by virtue of a vehicle 102, of which the vehicle display 108 is a component, and a mobile device 110 being communicatively coupled to each other.

Hence, a mobile device 110 may comprise a mobile device located in and/or at the vehicle 102, though a mobile device 110 may be external to a vehicle 102 and remain communicatively coupled to the vehicle 102. A mobile device 110 may comprise any suitable mobile device including, but not limited to, a mobile communication device, a cell phone, a radio, a laptop, and the like.

In particular, in a "normal" mode for a vehicle display 108 and a respective mobile display 112, a vehicle 102 and an associated mobile device 110 may be implementing respective applications (e.g., a vehicle display application and a mobile display application), which enable a respective mobile display 112 and a respective vehicle display 108, to provide similar information, and/or correlated information, provided at one or the other of the respective mobile display 112 and the respective vehicle display 108. Such applications may include, but are not limited to, instances of Apple CarPlay™ being implemented at a vehicle 102 and an associated mobile device 110, instances of Android Auto™ being implemented at a vehicle 102 and an associated mobile device 110, and the like, amongst other possibilities. Indeed, some examples provided herein may represent modifications and/or additions to such applications.

Furthermore, in a "normal" mode, correlated information being provided at the displays 108, 112 may be reformatted for different respective form factors of the displays 108, 112. For example, data, content, interfaces, and the like, at one display 108, 112 may be substantially, partially, or not at all correlated to data, content, interfaces at the other display 108, 112, including in some instances, mirroring one another, such that operations performed on one display 108, 112, at least in some embodiments, affects data, content, interfaces provided at the other display 108, 112.

The term "normal mode", as used herein, further include any suitable mode that occurs at a vehicle display 108 and/or a mobile device display 112 before an exited occupant support mode is implemented, The "normal" mode may include a mode in which a vehicle display 108 and a mobile device display 112 mirror each other (e.g., a "mirror mode") or some other configuration, such as a blacked out screen mode, a mapping/driving directions mode, and/or an incident or task list mode, among other possibilities or combinations of the foregoing.

In some examples, similar information being provided at the displays 108, 112 may mirror each other and the "normal" mode may colloquially be referred to as a "mirror" mode. However, the term "mirror" as used herein with respect to a mobile display 112 and an associated vehicle display 108 may include providing same, or similar, or correlated information, at both of the displays 108, 112, formatted according to a respective form factor of the displays 108, 112; such information need not be identical, however.

Figure 2:
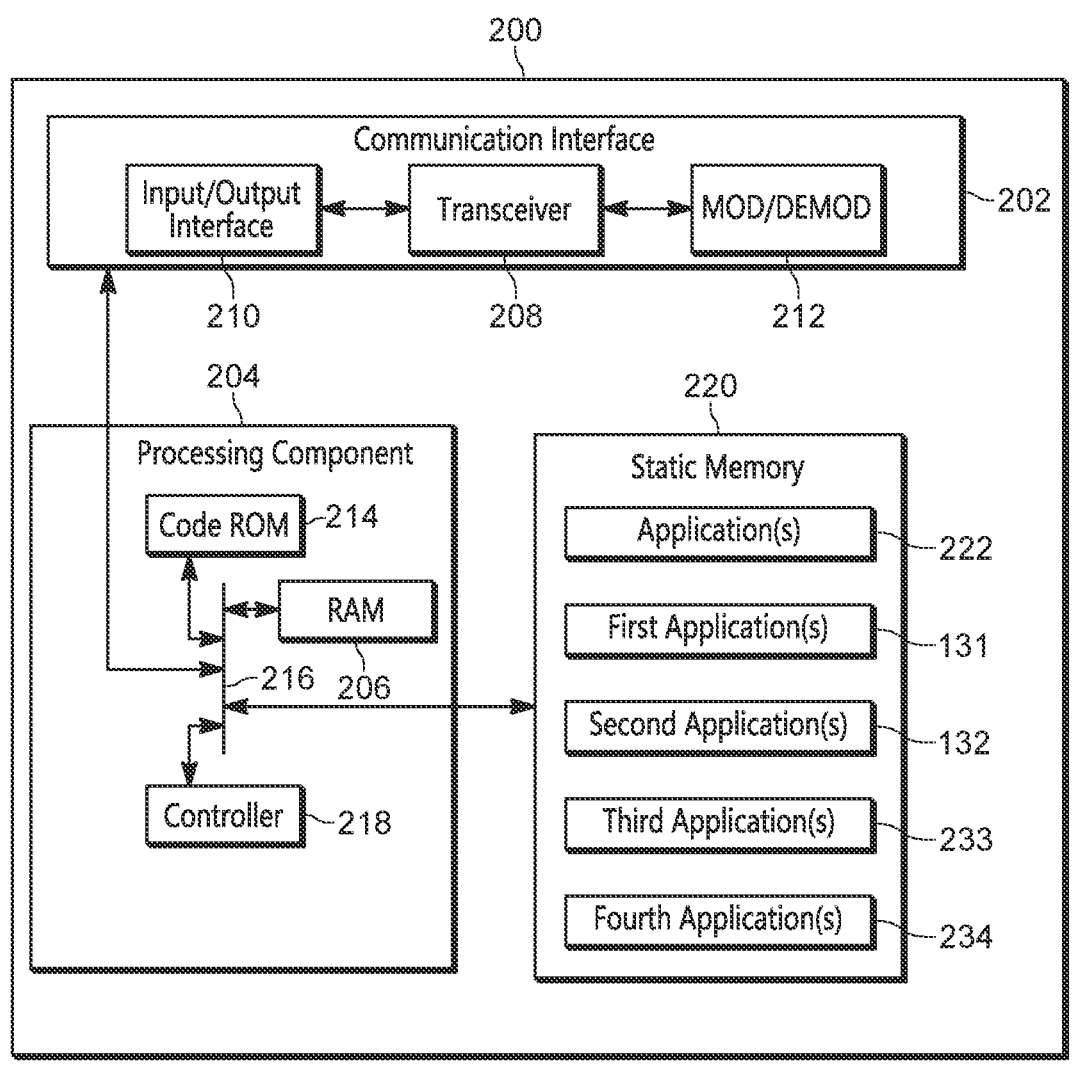
FIG. 2 is a device diagram showing a device structure of a computing device for controlling a vehicle-related display into an exited occupant support mode, in accordance with some examples.

As will be presently explained with respect to FIG. 2, the system 100 further comprises, for a pair of a vehicle 102 and an associated mobile device 110, a transceiver and at least one controller (e.g., a processor, and the like, and hereafter a controller) that are communicatively coupled to each other. The transceiver and the controller may be components of the vehicle 102 and/or components of the associated mobile device 110. Indeed, in some examples, the transceiver may be a component of one of a vehicle 102 and an associated mobile device 110, and the controller may be a component of the other of the vehicle 102 and the associated mobile device 110. Hence, for example, via a respective communication link between a vehicle 102 and an associated mobile device 110, computing resources and communication and/or radio resources may be shared between a vehicle 102 and an associated mobile device 110.

In particular, such a controller may include, but is not limited to, one or more an In-Car Processor (ICP) of a vehicle 102 and a mobile processor of an associated mobile device 110, amongst other possibilities, described below with respect to FIG. 2.

Furthermore, in the context of first responders, such a transceiver may include, but is not limited to, one or more of a vehicle-to-vehicle (V2V) transceiver (e.g., used to communicate between vehicles 102 when they are within a given distance, such as 100 meters, 250 meters, 500 meters, and the like, amongst other possibilities), a digital mobile radio (DMR) transceiver, a Project 25 (P25) transceiver, a terrestrial trunked radio (TETRA) transceiver, and a cellular transmitter, amongst other possibilities, described below with respect to FIG. 2.

Hence, vehicles 102, as described herein, may be directly communicatively coupled to each other, may be communicatively coupled via the network 101, and/or may be communicatively coupled via one or more networks external to the network 101.

For example, when the vehicles 102 are communicatively coupled via the network 101, communication links between the network 101 and the vehicles 102, as depicted in FIG. 1, are understood to represent communication links between respective transceivers of the vehicles 102 (e.g., which may include, but is not limited to, transceivers of the mobile devices 110), and the network 101.

Alternatively, and/or in addition, vehicles 102, as described herein, may be communicatively coupled to each other via a wireless and/or radio communication link (e.g., that may exclude the network 101) therebetween. For example, as depicted in FIG. 1, the vehicles 102 may be communicatively coupled via a direct V2V wireless communication link 113 (e.g., via respective V2V transceivers of the vehicles 102, though one or more of such V2V transceivers may alternatively be incorporated into one or more of the mobile devices 110).

A particular scenario will next be described, which will be used to better explain examples provided herein.

As depicted, one or more of the vehicles 102 may have been dispatched to an incident scene 114 that, while for simplicity is depicted generically as a star, is understood to include any suitable combination of vehicles, people, buildings, roads, or other infrastructure, amongst other possibilities, involved in an incident at an incident scene 114.

Continuing with the example, a vehicle 102, such as the first vehicle 102-1 or the second vehicle 102-1 may have arrived at the incident scene 114 without being dispatched, and reported the incident scene 114, for example to a cloud server 116 via the associated mobile device 110-1. The cloud server 116 may comprise, or be a component of, a publicsafety answering point (PSAP), dispatch center, and the like, and the cloud server 116 may have been used (e.g., by a dispatcher, not depicted), to dispatch other vehicles 102 to the incident scene 114. Alternatively, all the vehicles 102 may be dispatched to the incident scene 114, for example when a call is received (e.g., from a member of the public, or a first responder, amongst other possibilities) at a PSAP and/or a dispatch center, and the like.

The cloud server 116 may furthermore generate an incident report for the incident of the incident scene 114. For example, a location of the incident scene 114 may be determined for example in the form of an address, GPS coordinates, and the like, when a first vehicle 102 that arrives at the incident scene 114 reports an incident of the incident scene 114 (and/or the incident of the incident scene 114 is reported via call), including the location, to the cloud server 116 and/or the other vehicles 102. Such a location may be stored at an incident report, which may be generated by the cloud server 116, and which may also include a type of the incident scene 114.

It is furthermore understood that a second vehicle 102 may be optional in this scenario. For example, only one of the vehicles 102, such as the first vehicle 102-1, may be at the incident scene 114.

As depicted, a drone 118, and the like, may have been optionally dispatched (e.g., via the cloud server 116) and/or launched (e.g., by one of the vehicles 102) to hover over the incident scene 114, and the like, and stream video of the incident scene 114 to the cloud server 116 (and/or one or more of the vehicles 102), via the network 101, and/or to one or more of the vehicles 102, the video acquired via a camera 120 carried by the drone 118 (e.g., as depicted, the drone 118 may comprise a camera 120).

The incident scene 114 may be for any suitable incident, which may be managed by any suitable first responders, and which may include, but is not limited to, a police-related incident, a traffic stop, a 911-related incident, a fire-related incident, a medical-related incident, a security-related incident, and the like, amongst other possibilities.

However, in other examples, no dispatch may have occurred and the vehicles 102 may be on a routine patrol and come across the incident scene 114.

As depicted, the system 100 further comprises a vehicle egress sensor 122 generally configured to detect when an occupant 104, or an occupant 106, exits a vehicle 102, though present examples are described with respect to an occupant 104 exiting a vehicle 102.

In general, for the first vehicle 102-1 and the associated mobile device 110-1, a respective controller is generally configured to determine, via the vehicle egress sensor 122, whether an occupant 104 (or an occupant 106) has exited the first vehicle 102-1, or the second vehicle 102-4 proximal to the first vehicle 102-1. While present examples are described with respect to a first occupant 104 exiting a vehicle 102, it is understood that any of the occupants 104, 106 may exit a vehicle 102.

Furthermore, while only one vehicle egress sensor 122 is depicted, and is further depicted as separate from the vehicles 102, the system 100 may comprise more than one vehicle egress sensor 122, and various one or more vehicle egress sensors 122 may be deployed at each of the vehicles 102.

For example, the vehicle egress sensor 122 may comprise one or more of:

- A door sensor of the first vehicle 102-1 and/or the second vehicle 102-2. In these examples the vehicle egress sensor 122 may detect respective openings of doors of the vehicles 102, which may be used to determine or infer when an occupant 104, 106 has exited a vehicle 102. For example, before a vehicle 102 is turned on, and a door first opens as detected the vehicle egress sensor 122, such a first opening may indicate that an occupant 104, 106 has entered the vehicle 102, and later, the door opens again as detected the vehicle egress sensor 122, and such a second opening may indicate that the occupant 104, 106 has exited the vehicle 102.
- A seat sensor of the first vehicle 102-1 or the second vehicle 102-2. In these examples the vehicle egress sensor 122 may detect pressure and/or weight at a respective seat of an occupant 104, 106 to determine whether an occupant 104, 106 is located at the respective seat. For example, such a seat sensor may comprise a pressure and/or weight sensor, and when pressure and/or weight at a respective seat changes from above, to below, a threshold pressure and/or weight (e.g. 5 kgs, 10 kgs, 15 kgs, amongst other possibilities), such a change may indicate that a respective occupant 104, 106 has exited the vehicle 102.
- A video camera. Such a video camera may be located at one or more of the vehicles 102, and/or such a video camera may be external to a vehicle 102 (e.g. such a video camera may comprise a closed circuit video camera in communication with the cloud server 116). Using video analytics, video from a video camera may be used to detect when an occupant 104, 106 has exited a vehicle 102. Analysis of such video may occur at a controller associated with one or more of the vehicles 102, and/or such analysis may occur at the cloud server 116. When such analysis occurs at the cloud server 116, the cloud server 116 may transmit an indication of a detection of an occupant 104, 106 exiting a respective vehicle 102 to one or more of the vehicles 102 and/or an associated mobile device 110. Such an example assumes that an exterior of a vehicle 102 where an occupant 104, 106 exits is within a field-of-view of a video camera.
- A location sensor configured to sense a location of an occupant 104, 106 that exits the first vehicle 102-1 or the second vehicle 102-2. For example, an occupant 104, 106 may be wearing a location sensor and/or carrying a device, such as a radio or a mobile device (e.g. similar to a mobile device 110), or another device (e.g. a body worn camera (BWC), a biometric sensor, and the like) that includes a location sensor. Such a location sensor may comprise any suitable location determining device (e.g., such as a Global Positioning System (GPS) device), which may be used to determine location of an occupant 104, 106 (e.g. as a function of time), for example relative to a location of a vehicle 102 (e.g. a location of a vehicle 102 from which an occupant 104, 106 exits may also be determined via a location sensor of the vehicle 102 and/or a respective mobile device 110). Hence, when a location of an occupant 104, 106 is within a threshold distance (e.g. 0.5 m, 1 m, 1.5 m, amongst other possibilities from an associated vehicle 102) from a respective vehicle 102, and then moves beyond that threshold distance from the vehicle 102, the occupant 104, 106 is determined to have exited the vehicle 102.
- A presence sensor configured to presence of an occupant 104, 106 that exits the first vehicle 102-1 or the second vehicle 102-2, and which may be based on microwave radar technology to sensitively detect human motion. For example, such a presence sensor may be located on an external surface of a vehicle 102, and may detect when an occupant 104, 106 is exits the vehicle 102, for example when exiting via a particular door.
- An occupant-vehicle communication device, based in Near Field Communication (NFC), Bluetooth™, and the like. For example, an occupant 104, 106 may be wearing such an NFC and/or Bluetooth™ device in communication with a similar device of a vehicle 102. As such devices generally remain in communication over a relatively small distance, such as 10 m, 20 m, 30 m, and the like, when an NFC and/or Bluetooth™ vehicle communication device loses communication with an NFC and/or Bluetooth™ occupant communication device, the NFC and/or Bluetooth™ vehicle communication device may determine that the occupant 104, 106 wearing the NFC and/or Bluetooth™ occupant communication device has exited the vehicle 102.

Furthermore, for the first vehicle 102-1 and an associated mobile device 110, a respective controller is further generally configured to, in response to determining that an occupant 104 has exited the first vehicle 102-1, or the second vehicle 102-4 proximal to the first vehicle 102-1, selectively enable an exited occupant support mode at one or more of the first vehicle display 108-1 and the first mobile display 112-1.

For example, when the first occupant 104-1 exits the first vehicle 102-1, or when the first occupant 104-2 exits the second vehicle 102-2, as detected by the vehicle egress sensor 122, the exited occupant support mode may be enabled at one or more of the first vehicle display 108-1 and the first mobile display 112-1.

In the exited occupant support mode, one or more applications may be selectively enabled at one or more of the first vehicle display 108-1 and the first mobile display 112-1, the one or more applications for supporting the occupant 104 that exited the first vehicle 102-1 or the second vehicle 102-2.

Alternatively, or in addition, in the exited occupant support mode, applications currently enabled at one or more of the first vehicle display 108-1 and the first mobile display 112-1 may be changed from a first mode to a second mode for supporting the occupant 104 that exited the first vehicle 102-1 or the second vehicle 102-2.

Hence, present examples include at least two scenarios. In a first scenario, when a first occupant 104-1 exits the first vehicle 102-1, one or more of the first vehicle display 108-1 and the first mobile display 112-1 are placed into the exited occupant support mode. In such a scenario, the second vehicle 102-2 may be optional.

In a second scenario, when a first occupant 104-2 exits the second vehicle 102-2, one or more of the first vehicle display 108-1 and the first mobile display 112-1 of the first vehicle 102-1 are placed into the exited occupant support mode. In this scenario, a respective controller of the first vehicle 102-1 and/or the first mobile device 110-1 may be further configured to determine whether the vehicles 102 are in proximity. For example, the vehicles 102, and/or associated mobile devices 110, may comprise location determining sensors and locations of the vehicles 102, and/or associated mobile devices 110, as determined via the location determining sensors, may be reported to each other (e.g. via the network 101, and/or the link 113, and/or the cloud server 116. Hence, the vehicles 102, and/or the mobile devices 110, and/or the cloud server 116 is understood to have access to locations of the vehicles 102, and/or the mobile devices 110, and hence the vehicles 102 relative proximity may be determined. In particular, the vehicles 102 may be determined to be proximal to each other when the vehicles 102 (e.g. and/or the mobile devices 110) are within a threshold proximal distance (e.g. 5 m, 10 m, 20 m, amongst other possibilities). Determination of proximity of the vehicles 102 may be performed using geofencing techniques.

In yet further examples, it is understood that placing displays 108, 112 of a vehicle 102 into an exited occupant support mode may depend on whether or not there is a remaining occupant 104, 106 in a vehicle 102. For example, the system 100 may comprise one or more occupant sensors, which may be similar to the vehicle egress sensor 122, that may be used to determine whether or not there is a remaining occupant 104, 106 in a vehicle 102, when an occupant 104 exits the first vehicle 102-1 or the second vehicle 102-2. For example, when the first occupant 104-1 exits the first vehicle 102-1, but the second occupant 104-2 is either not present in the system 100, or also exits the first vehicle 102-1, the first vehicle display 108-1 and the first mobile display 112-1 of the first vehicle 102-1 may not be placed into the exited occupant support mode, but rather the second vehicle display 108-2 and the second mobile display 112-2 of the second vehicle 102-2 are placed into the exited occupant support mode, presuming at least one occupant 104-2, 104-2 remains in the second vehicle 102-2.

In some of these examples, when the first occupant 104-1 exits the first vehicle 102-1, but the second occupant 104-2 is either not present in the system 100, or also exits the first vehicle 102-1, the first vehicle display 108-1 and/or the first mobile display 112-1 of the first vehicle 102-1 may be turned off and/or may be blanked out, and/or may be placed into an energy saving mode, all of which may save power at the first vehicle 108-1 and/or the first mobile device 110-1. As the first vehicle 108-1 and/or the first mobile device 110-1 are generally powered by a battery (not depicted) placing the first vehicle display 108-1 and/or the first mobile display 112-1 into an energy saving mode may lengthen battery life at one or more of the first vehicle 108-1 and/or the first mobile device 110-1.

Furthermore, in some examples, when a vehicle display 108 and/or a mobile display 112 of a vehicle 102 is placed in the exited occupant support mode due to an occupant 104, 106 exiting another vehicle 102, the exited occupant support mode of the vehicle display 108 and/or the mobile display 112 may depend on whether there is an occupant 104, 106 remaining in the other vehicle 102. For example, when the second vehicle display 108-2 and/or the second mobile display 112-2 of the second vehicle 102-2 is placed into the exited occupant support mode due to the first occupant 104-1 exiting the first vehicle 102-1, the exited occupant support mode of the second vehicle display 108-2 and/or the second mobile display 112-2 may depend on whether the occupant 106-1 is present or not present in the first vehicle 102-1 (e.g. and/or whether any occupants 104, 106 are present or not present in the first vehicle 102-1). For example, when there is an occupant 106 left in the first vehicle 102-1, in the exited occupant support mode, the second vehicle display 108-2 and/or the second mobile display 112-2 may show video from the camera 120 of the drone 118, but not video from a BWC of the exited occupant 104-1 of the first vehicle 102-1. However, when there is no occupant 104, 106 left in the first vehicle 102-1, in the exited occupant support mode, the second vehicle display 108-2 and/or the second mobile display 112-2 may show video from the camera 120 of the drone 118, video from a BWC of any exited occupants 104, 106 of the first vehicle 102-1, video from a dashboard camera of the first vehicle 102-1, amongst other possibilities, distributed amongst the second vehicle display 108-2 and/or the second mobile display 112-2 in any suitable manner. A determination of whether, or not, there is an occupant 104, 106 left in the first vehicle 102-1 may occur via the egress sensor 122.

Hence, while present examples are described with respect to the first vehicle display 108-1 and the first mobile display 112-1 being placed into the exited occupant support mode, the second vehicle display 108-2 and the second mobile display 112-2 may also be placed into a respective exited occupant support mode, for example when the first occupant 104-2 exits the second vehicle 102-2, and/or when the first occupant 104-1 exits the first vehicle 102-1, and the vehicles 102 are determined to be proximal to each other (and at least one occupant 104-2, 106-2 remains in the second vehicle 102-2).

As depicted in FIG. 1, prior to an occupant 104 exiting a vehicle 102, a first application 131 (e.g. a vehicle display application 131) has been selectively implemented at the vehicle displays 108 and a second application 132 (e.g. a mobile display application) has been selectively implemented at the mobile displays 112. For example in FIG. 1, using a traffic stop as an example incident of the incident scene 114, the first application 131 and the second application 132 comprises an LPR application. For example, at the vehicle displays 108, the LPR application of the first application 131 includes LPR data of a license plate number (e.g., "ABC123") and a name of a driver (e.g., "B. Smith") associated with the license plate number. Similarly, at the mobile displays 112, the LPR application of the second application 132 includes the same LPR data provided at the vehicle displays 108, but expanded to include an address (e.g., "123 Main St.") of the driver associated with the license plate number. Alternatively, or in addition, the vehicle displays 108 and respective mobile displays 112 may mirror each other (e.g. in a "mirror mode"), and the like.

However, in some examples, as will be described with respect to FIG. 5, after an occupant 104 has exited a vehicle 102, different applications may be selectively enabled at one or more of the one or more of the vehicle displays 108 and/or one or more of the mobile device displays 112, which support the occupant 104 that has exited the vehicle 102. Such applications may include, for example, a body worn camera output application that provides streamed video of a body worn camera worn by the exited occupant 104, a vital sign application providing vital signs, and/or other biometric data, of the exited occupant 104 as detected by, and received from, a biometric monitor worn by the exited occupant 104, a drone control application for controlling the drone 118 launched to assist the exited occupant 104, and the like, amongst other possibilities.

Alternatively, and/or in addition, after an occupant 104 has exited a vehicle 102, different modes of one or more of the applications 131, 132 may be selectively enabled at one or more of the one or more of the vehicle displays 108 and/or one or more of the mobile device displays 112, which support the occupant 104 that has exited the vehicle 102. For example, the depicted LPR application of the applications 131, 132 may be placed into a mode where any available criminal history of the driver of the vehicle stopped at the traffic stop is provided at one or more of the vehicle displays 108 and/or one or more of the mobile device displays 112 (or, if no criminal history exists, then an indication of such may be one or more of the vehicle displays 108 and/or one or more of the mobile device displays 112). Such additional criminal history may notify the remaining occupants 104, 106 that more backup may be required to assist the exited occupant 104.

Such selective enablement of applications, and/or modes, may be to ensure that functionality provided in association with a vehicle display 108 is different from functionality provided in association with a mobile display 112, for example to use processing resources and/or bandwidth resources at the vehicles 102 at the incident scene 114 more effectively and/or so as not to duplicate processing at the vehicles 102 at the incident scene 114, and/or to add additional useful functionality to assist the vehicles 102, and associated mobile devices 110 and their occupant owner operators (e.g., the occupants 104, 106), in cooperating in a manner that may enable an incident at the incident scene 114 to be more quickly managed and/or resolved. In particular, from a point of view of the occupant owner operators (e.g., the occupants 104, 106) such selective enablement of applications, and/or modes, may assist in resolving an incident at the incident scene 114 faster and/or better than if such selective enablement of applications did not occur. Indeed, such selective enablement of applications, and/or modes, may cause the displays 108, 112 to provide information and/or functionality that is most relevant for respective occupant owner operators, which may be achieved by providing different information and/or different functionality different things to different occupant owner operators. It is further understood however, that such selective enablement of applications, and/or modes may generally optimize use processing resources and/or bandwidth in the system 100, for example, by using a controller of one of a mobile device 110 or a vehicle computing device for selective enablement of applications, and/or modes and centrally controlling such selective enablement of applications, and/or modes.

Attention is next directed to FIG. 2, which depicts a schematic block diagram of an example of a computing device 200, which may comprise a computing device of a vehicle 102 and/or an associated mobile device 110. While the computing device 200 is depicted in FIG. 2 as a single component, functionality of the computing device 200 may be distributed among a plurality of components and the like including, but not limited to, any suitable combination of a vehicle 102 and an associated mobile device 110, and the like.

As depicted, the computing device 200 comprises: a communication interface 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, at least one controller 218 (e.g. hereafter the controller 218), and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 200 may have any suitable structure and/or configuration.

While not depicted, the computing device 200 may include, and/or be communicatively coupled to, one or more of an input component and a display screen (e.g., one or more of displays 108, 112) and the like.

As shown in FIG. 2, the computing device 200 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more transceivers 208 for wirelessly communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standards (e.g., 802.11a, 802.11b, 802.11g), a 3GPP (3rd Generation Partnership Project) 4G LTE (Long-Term Evolution) network, a 3GPP 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or other types of GSM (Global System for Mobile communications) and/or another similar type of wireless networks. Hence, the one or more transceivers 208 may include, but are not limited to, a cell phone transceiver, a DMR transceiver, P25 transceiver, a TETRA transceiver, a 3GPP transceiver, a 4G LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

It is understood that DMR transceivers, P25 transceivers, and TETRA transceivers may be particular to public entity first responders, and hence, in some examples, the system 100 may be operated by a first responder public entity (e.g., such as a police department, a fire department, an emergency medical services department, and the like). In other examples, however, the system 100 may be operated by an enterprise entity, including, but not limited to, business, industrial or utility entities, which, for example, may deploy private first responders to an incident scene (e.g., such as security guards and the like).

The communication interface 202 may further include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The transceiver 208 may also be coupled to a combined modulator/demodulator 212.

In a particular example, the transceiver 208 may comprise a V2V transceiver configured to communicate with corresponding V2V transceivers of other vehicles 102, for example with a given distance (e.g., such as 100 meters, 250 meters, 500 meters, and the like, amongst other possibilities), using any suitable protocol.

Hence, the transceiver 208 and/or the communication interface 202 may enable a vehicle 102 and/or an associated mobile device 110, to communicate with other vehicles 102 and/or other mobile devices 110 associated with other vehicles 102, and/or the transceiver 208 and/or the communication interface 202 may enable a vehicle 102 and/or an associated mobile device 110, to communicate with the cloud server 116 (and/or the drone 118).

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device.

In a particular example, the controller 218 may comprise one or more of: an In-Car Processor (ICP) of a vehicle 102; and/or a mobile processor of an associated mobile device 110.

In some examples, the controller 218 and/or the computing device 200 is not a generic controller and/or a generic device, but a device specifically configured to implement functionality for controlling a vehicle-related display into an exited occupant support mode. For example, in some examples, the computing device 200 and/or the controller 218 specifically comprises a computer executable engine configured to implement functionality for controlling a vehicle-related display into an exited occupant support mode.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 200 as described herein are maintained, persistently, at the memory 220 and used by the controller 218, which makes appropriate utilization of volatile storage during the execution of such programming instructions.

Figure 3:
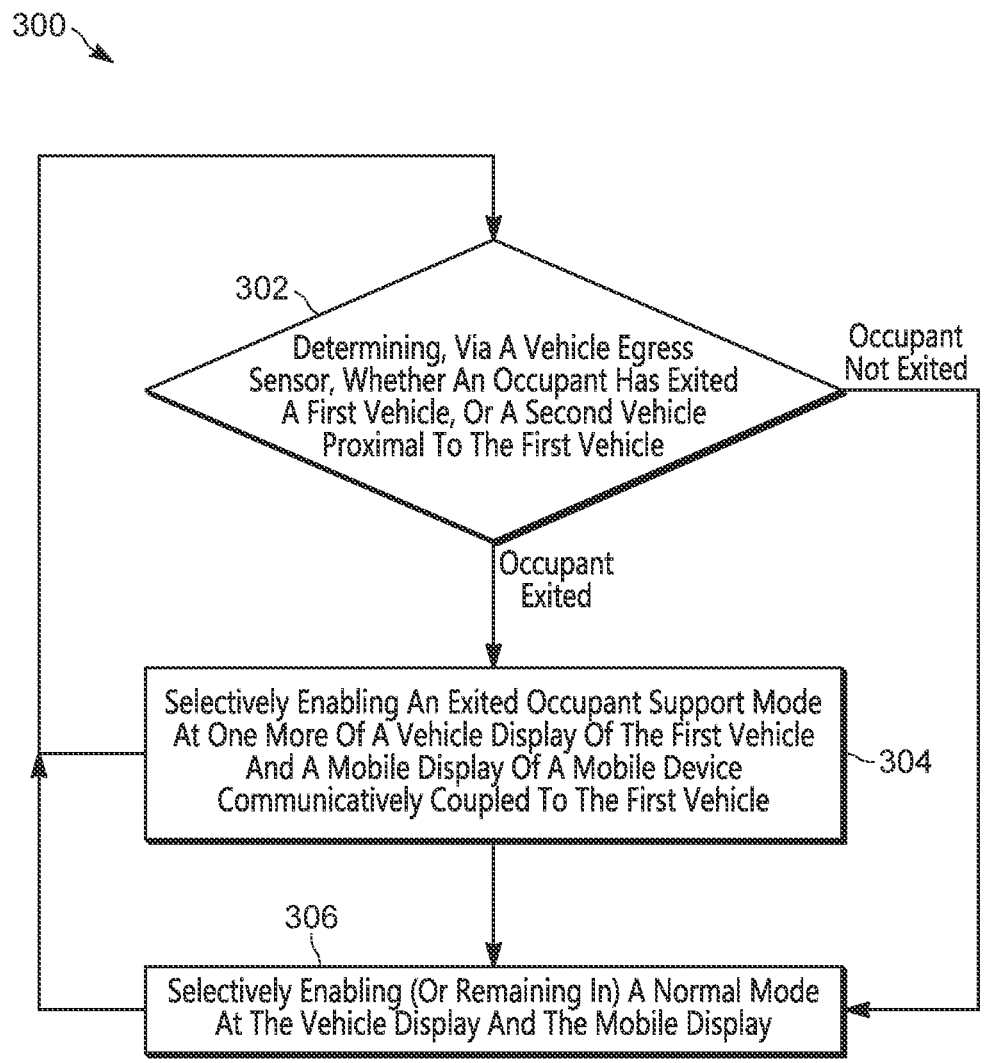
FIG. 3 is a flowchart of a method for controlling a vehicle-related display into an exited occupant support mode, in accordance with some examples.

Regardless, it is understood that the memory 220 stores instructions corresponding to the at least one application 222 that, when executed by the controller 218, enables the controller 218 to implement functionality for controlling a vehicle-related display into an exited occupant support mode, including, but not limited to, the blocks of the method set forth in FIG. 3.

As depicted, the memory 220 further stores instructions corresponding to at least one first application 131, at least one second application 132, at least one third application 233, and at least one fourth application 234.

The first application 131 may be selectively enabled (e.g., by the controller 218) for presentation at a vehicle display 108 for example in a "normal mode" and/or "mirror mode" and/or prior to an occupant 104 exiting a vehicle 102 and/or when a vehicle 102 arrives at an incident scene (e.g. the incident scene 114) before an exited occupant support mode is implemented.

Similarly, the second application 132 may be selectively enabled (e.g., by the controller 218) for presentation at a mobile device display 112 for example in the "normal mode" and/or "mirror mode" and/or prior to an occupant 104 exiting a vehicle 102, and/or when a vehicle 102 arrives at an incident scene (e.g. the incident scene 114) before an exited occupant support mode is implemented.

In some examples, the applications 131, 132 (and/or corresponding modes of the displays 108, 112) may be selectively enabled when a vehicle 102 and/or an associated mobile device 110 arrives at the incident scene 114. In these examples, the controller 218 may be further enabled to determine when a vehicle 102 and/or an associated mobile device 110, arrives at an incident scene. Herein, a vehicle 102 "arriving" at an incident scene is understood to include the vehicle 102 being within a given distance of a location of an incident scene (e.g., 10 m, 20 m, 50 m, amongst other possibilities). Furthermore, a vehicle 102 "arriving" at an incident scene may further include the vehicle 102 being stopped within the given distance.

The third application 233 may be selectively enabled (e.g., by the controller 218) for presentation at a vehicle display 108 in the exited occupant support mode, and/or when the vehicle display 108 is placed into the exited occupant support mode.

Similarly, the fourth application 234 may be selectively enabled (e.g., by the controller 218) for presentation at an associated mobile display 112 in the exited occupant support mode, and/or when the associated mobile display 112 is placed into the exited occupant support mode. Indeed, the third application 233 and the fourth application 234 may be respectively selectively enabled in tandem for presentation at a vehicle display 108 and an associated mobile display 112, for example in the exited occupant support mode.

Examples of the applications 131, 132, 233, 234 are described in more detail below with respect to FIG. 4 and FIG. 5.

Particular examples of the applications 131, 132, 233, 234 according to an incident type are provided in Table 1, Table 2, and Table 3.

However, more than one of each of the applications 131, 132, 233, 234 may be provided, and which of a particular application 131, 132, 233, 234 is implemented may depend on a type of an incident scene at which the vehicles 102 arrive.

For example, when the incident scene 114 comprises a traffic stop-type incident, the first application 131 and the second application 132 may comprise an LPR output application, and the applications 233, 234 may be selectively enabled accordingly.

In another example, when the incident scene 114 comprises a fire-related incident, the first application 131 and the second application 132 comprise a fire hydrant location application, and the remainder of the applications 233, 234 may be selectively enabled accordingly.

It is further understood that the application 233 may be the same or similar to the first (e.g. vehicle display application) 131. Similarly, the application 234 may be respectively the same or similar to the second (e.g. mobile display application) 132.

Indeed, in some examples, the memory 220 may store one vehicle display application and one mobile display application (e.g. such as the applications 131, 132, which, themselves, may be a same or similar application).

In these examples, a vehicle display 108 may be selectively enabled from a normal mode to an exited occupant support mode by changing a mode of a vehicle display application from a normal mode to a respective exited occupant support mode. Similarly, a mobile display 112 may be selectively enabled from a normal mode to an exited occupant support mode by changing a mode of a mobile display application from a normal mode to a respective exited occupant support mode.

While details of the cloud server 116 and the drone 118 are not depicted, the cloud server 116 and the drone 118 may have components similar to the computing device 200 adapted, however, for the functionality thereof.

Attention is now directed to FIG. 3, which depicts a flowchart representative of a method 300 for controlling a vehicle-related display into an exited occupant support mode. The operations of the method 300 of FIG. 3 correspond to machine readable instructions that are executed by the computing device 200, and specifically the controller 218 of the computing device 200. In the illustrated example, the instructions represented by the blocks of FIG. 3 are stored at the memory 220 for example, as the application 222. The method 300 of FIG. 3 is one way that the controller 218 and/or the computing device 200 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Hereafter, the method 300 is described with respect to being implemented by a controller 218 of the first vehicle 102-1 and/or the first mobile device 110-1, and control of the first vehicle display 108-1 and/or the first mobile display 112-1 occurs. However, alternatively, or in addition, the method 300 may be implemented by a controller 218 of the second vehicle 102-2 and/or the second mobile device 110-2, and control of the second vehicle display 108-2 and/or the second mobile display 112-2 may occur.

At a block 302, the controller 218, and/or the computing device 200, determines, via the vehicle egress sensor 122, whether an occupant 104 has exited the first vehicle 104-1, or the second vehicle 102-2 proximal to the first vehicle 102-1.

It is understood that, in some examples, the method 300 may further comprise the controller 218, and/or the computing device 200 determining locations of the vehicles 102; and determining, from the locations whether the second vehicle 102-2 is proximal to the first vehicle 102-1. When the second vehicle 102-2 is proximal to the first vehicle 102-1 (e.g. the vehicles 102 are within the aforementioned threshold proximal distance), the controller 218, and/or the computing device 200 may determine, at the block 302, whether an occupant 104 has exited the first vehicle 104-1 or the second vehicle 102-2 proximal to the first vehicle 102-1. However, when the second vehicle 102-2 is not proximal to the first vehicle 102-1 1 (e.g. the vehicles 102 are not within the aforementioned threshold proximal distance), the controller 218, and/or the computing device 200 may determine, at the block 302, whether an occupant 104 has exited the first vehicle 104-1 (but not whether an occupant 104 has exited the second vehicle 102-2).

In response to determining that an occupant 104 has exited the first vehicle 104-1, or the second vehicle 102-2 proximal to the first vehicle 102-1 (e.g. an "Occupant Exited" decision at the block 302), at a block 304, the controller 218, and/or the computing device 200 selectively enables an exited occupant support mode at one or more of the vehicle display 108-1 (e.g. the first vehicle display 108-1) and the mobile display 112-1 (e.g. the first mobile display 112-1).

However, in response to determining that an occupant 104 has not exited the first vehicle 104-1 (or, e.g., that the occupant 104 previously exited the vehicle 102 but has since returned), or the second vehicle 102-2 proximal to the first vehicle 102-1 (e.g. an "Occupant Not Exited" decision at the block 302), at a block 306, the controller 218, and/or the computing device 200 selectively enables a normal mode the vehicle display 108-1 (e.g. the first vehicle display 108-1) and the mobile display 112-1 (e.g. the first mobile display 112-1). When, at the block 306, the vehicle display 108-1 (e.g. the first vehicle display 108-1) and the mobile display 112-1 (e.g. the first mobile display 112-1) are already in a normal mode, the vehicle display 108-1 (e.g. the first vehicle display 108-1) and the mobile display 112-1 (e.g. the first mobile display 112-1) remain in a normal mode.

Put another way, in examples where the block 304 has been previously implemented, an "Occupant Not Exited" decision at the block 302 may occur when the occupant 104 returns to the vehicle 102 previously exited, and the block 306 may be implemented to switch the vehicle display 108-1 (e.g. the first vehicle display 108-1) and the mobile display 112-1 (e.g. the first mobile display 112-1) back to the normal mode.

However, in examples where the vehicle display 108-1 (e.g. the first vehicle display 108-1) and the mobile display 112-1 (e.g. the first mobile display 112-1) are currently in the normal mode, an "Occupant Not Exited" decision at the block 302 may occur when an occupant 104 has not exited a vehicle 102, and the block 306 may be implemented such that the vehicle display 108-1 (e.g. the first vehicle display 108-1) and the mobile display 112-1 (e.g. the first mobile display 112-1) remain in the normal mode.

The method 300 may hence repeat from the block 304 and the block 306.

When the method 300 repeats from the block 304 (e.g. due to an earlier determination of "Occupant Exited" at the block 302), and, at the block 302, an "Occupant Not Exited" decision occurs, the block 306 may be implemented to change the vehicle display 108 and the mobile display 112 from the exited occupant support mode back to the normal mode.

Some further aspects of the method 300 are next described.

In some examples, the method 300 may further comprise the controller 218 and/or the computing device 200, prior to enabling the exited occupant support mode, selectively enabling: the first application 131 for presentation at the vehicle display 108-1; and the second application for presentation at the mobile display 112-1; and after enabling the exited occupant support mode, selectively enabling one or more of: the third application 233 for presentation at the vehicle display 108-1, the third application 233 for supporting the occupant 104 that exited the first vehicle 102-1 or the second vehicle 102-2; and the fourth application 234 for presentation at the mobile display 112-1, the fourth application 234 for supporting the occupant 104 that exited the first vehicle 102-1 or the second vehicle 102-2.

For example, as described with respect to FIG. 1, prior to enabling the exited occupant support mode, the vehicle display 108-1 and the mobile display 112-1 (e.g. and also the vehicle display 108-2 and at the mobile display 112-2) may be respectively implementing the first application 131 and the second application 132. However, after enabling the exited occupant support mode, the vehicle display 108-1 and at the mobile display 112-1 (e.g. and also the vehicle display 108-2 and at the mobile display 112-2) may be respectively implementing the third application 233 and the fourth application 234, as described below with respect to FIG. 5.

Put another way, at the block 304, the controller 218 and/or computing device 110 may change the vehicle display 108 and the mobile display 112 from an initial mode and/or a "normal" mode (including, but not limited to, a "mirror" mode), into an exited occupant support mode, for example by stopping implementation of the applications 131, 132, and selectively enabling the third application 233 and the fourth application 234.

Similarly, at the block 306, the controller 218 and/or computing device 110 may change the vehicle display 108 and the mobile display 112 from the exited occupant support mode into the normal mode, for example by stopping implementation of the applications 233, 234, and selectively enabling the applications 131, 132.

In some of these examples, the third application 233 may be different from the first application 131, and the fourth application 234 may be different from the second application 132. Furthermore, respective third applications 233 implemented at the first vehicle display 108-1 and the second vehicle display 108-2 may be different from one another, and, similarly, respective fourth applications 234 implemented at the first mobile display 112-1 and the second mobile display 112-2 may be different from one another Alternatively, in other examples, the method 300 may further comprise the controller 218 and/or the computing device 200: prior to enabling the exited occupant support mode, selectively enabling: the first application 131 for presentation at the vehicle display 108-1 in a first mode; and a second application 132 for presentation at the mobile display 112-1 in a respective first mode; and after enabling the exited occupant support mode, one or more of: changing the first application 131 from the first mode to a second mode for supporting the occupant 104 that exited the first vehicle 102-1 or the second vehicle 102-2; and changing the second application 132 from the respective first mode to a respective second mode for supporting the occupant 103 that exited the first vehicle 102-1 or the second vehicle 102-2.

Put another way, at the block 304, the controller 218 and/or computing device 110 may change the vehicle display 108 and the mobile display 112 from an initial mode and/or a "normal" mode, into an exited occupant support, for example by changing a mode of the applications 131, 132 from a normal mode to the exited occupant support mode.

Similarly, at the block 306, the controller 218 and/or computing device 110 may change the vehicle display 108 and the mobile display 112 from the exited occupant support mode into the normal mode, for example by changing a mode of the applications 131, 132 from the exited occupant support mode to the normal mode.

For example, as has already been described, an LPR application of the applications 131, 132 may be placed into a mode where any available criminal history of a driver of a vehicle stopped at the traffic stop of the incident scene 114 may be is provided at one or more of the vehicle displays 108 and/or one or more of the mobile device displays 112 (or, if no criminal history exists, then an indication of such may be one or more of the vehicle displays 108 and/or one or more of the mobile device displays 112).

Put another way, the method 300 may further comprise the controller 218 and/or the computing device 200: prior to the determination that that the occupant 104 has exited the first vehicle 102-1, or the second vehicle 102-2 proximal to the first vehicle 102-1, one or more of the vehicle display 108-1 and the mobile display 112-1 may be in a mode other than the exited occupant support mode. Such a mode that is other than the exited occupant support mode may be any suitable node, including, but not limited to, the aforementioned normal mode and/or mirror mode.

For example, one or more of the occupants 104-1, 106-1 may be using a radio function of the first vehicle 102-1 and/or the first mobile device 110-1, and one or more of the vehicle display 108-1 and the mobile display 112-1 may be in a radio mode providing information associated with the radio function (e.g. a channel number and/or name, and the like).

In the exited occupant support mode, one or more of the vehicle display 108-1 and the mobile display 112-1 may provide any suitable data.

For example, in the exited occupant support mode, one or more of the vehicle display 108-1 and the mobile display 112-1 may provide data associated with a respective mobile device of the occupant 104 that exited the first vehicle 102-1 or the second vehicle 102-2.

Alternatively, or in addition, in the exited occupant support mode, one or more of the vehicle display 108-1 and the mobile display 112-1 may provide data received from a respective mobile device of the occupant 104 that exited the first vehicle 102-1 or the second vehicle 102-2.

The data associated with a respective mobile device of the occupant 104 that exited the first vehicle 102-1 or the second vehicle 102-2 may comprise historical data previously received at the cloud server 116 from the respective mobile device of the occupant 104 that exited the first vehicle 102-1 or the second vehicle 102-2, prior to the exited occupant support mode being enabled, and downloaded to the first vehicle 102-1 and/or the associated mobile device 110-1. Examples of such historical data are described in more detail below, and may include, but is not limited to: historical post-occupant-exit audio and/or video (e.g. previous audio or video from a BWC worn by the exited occupant 104, historical post-occupant-contextual information (e.g. a previous location of the exited occupant 104), amongst other possibilities.

Alternatively, or in addition, the data associated with a respective mobile device of the occupant 104 that exited the first vehicle 102-1 or the second vehicle 102-2 may comprise historical data previously received at the first vehicle 102-1 and/or the associated mobile device 110-1 from the respective mobile device of the occupant 104 that exited the first vehicle 102-1 or the second vehicle 102-2, prior to the exited occupant support mode being enabled.

In contrast, the data received from a respective mobile device of the occupant 104 that exited the first vehicle 102-1 or the second vehicle 102-2 may comprise live data currently being received from a respective mobile device of the occupant 104 that exited the first vehicle 102-1 or the second vehicle 102-2, and the data may be received at the first vehicle 102-1 and/or the associated mobile device 110-1 from the respective mobile device of the occupant 104 that exited the first vehicle 102-1 or the second vehicle 102-2, and/or via the cloud server 116.

Hence, in the exited occupant support mode, one or more of the vehicle display 108-1 and the mobile display 112-1 may provide data received from the cloud server 116 in communication with a respective mobile device of the occupant 104 that exited the first vehicle 102-1 or the second vehicle 102-2.

In particular examples, the occupant 104 may be wearing a BWC and/or a biometric monitor and/or a location determining device, and the like. In such examples, data associated with, or received from, a respective mobile device of the occupant 104 that exited the first vehicle 102-1 or the second vehicle 102-2, and provided at one or more of the vehicle display 108-1 and the mobile display 112-1 in the exited occupant support mode may include, but is not limited to, previously or currently streamed BWC video from the BWC, and/or previous or current biometric data from the biometric monitor, and/or a previous or current location of the occupant 104 from the location determining device, and the like.

However, any suitable data may be provided in the exited occupant support mode.

For example, in the exited occupant support mode one or more of the vehicle display 108-1 and the mobile display 112-1 may provide one or more of:

Real-time and/or historical post-occupant-exit audio and/or video, for example audio or video from a BWC worn by the exited occupant 104.

Streamed text associated with the respective mobile device of the occupant that exited the first vehicle 102-1 or the second vehicle 102-2, for example text that has been converted from audio or video from a BWC worn by the exited occupant 104.

Real-time or historical post-occupant-contextual information, which may include, but is not limited to, a location of the exited occupant 104, displayed relative to tasks or incidents associated with the exited occupant 104. For example, the location of the exited occupant 104 may be provided at one or more of the vehicle display 108-1 and the mobile display 112-1 along with an indication of an incident the incident scene 114, and/or any first responder tasks related to the incident scene.

Figure 4:
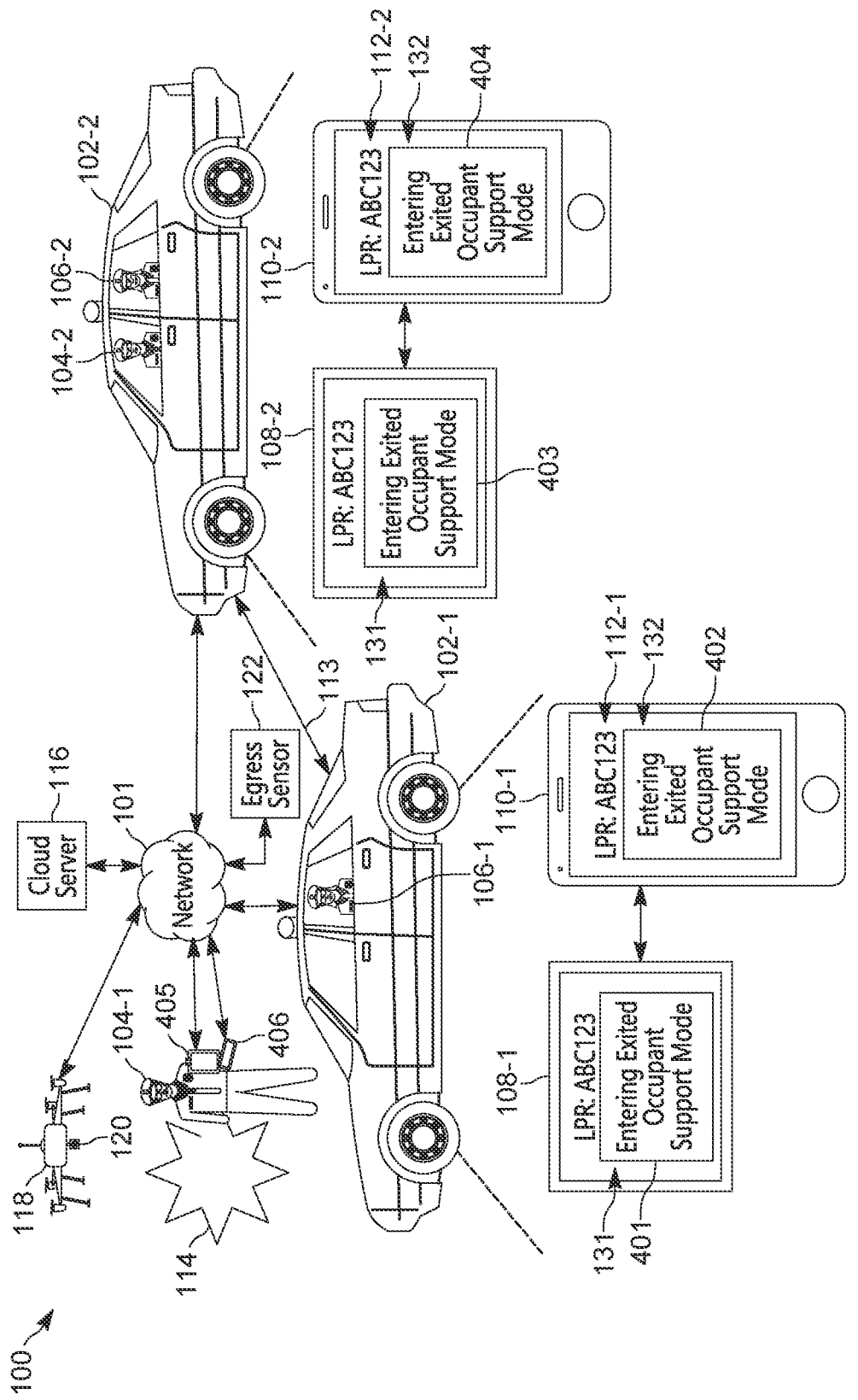
FIG. 4 depicts the system of FIG. 1 implementing aspects of a method for controlling a vehicle-related display into an exited occupant support mode, in accordance with some examples
Figure 5:
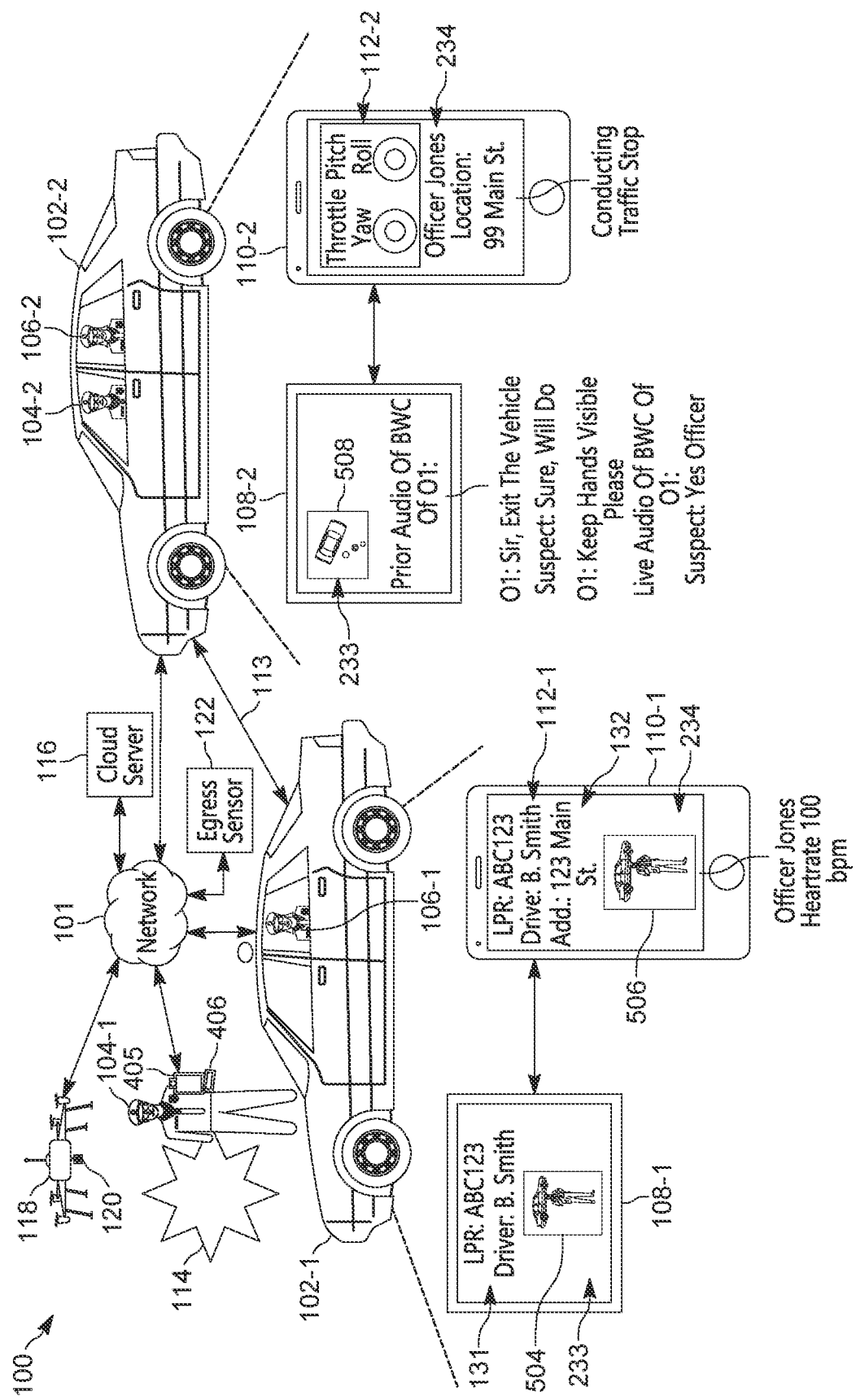
FIG. 5 depicts the system of FIG. 1 implementing further aspects of a method for controlling a vehicle-related display into an exited occupant support mode, in accordance with some examples.

Attention is next directed to FIG. 4 and FIG. 5, which depict an example of aspects of the method 300. FIG. 4 and FIG. 5 are substantially similar to FIG. 1, with like components having like numbers.

With attention first directed to FIG. 4, it is understood that the displays 108, 112 are initially in the aforementioned normal mode. However, it is further understood that in FIG. 4, the first occupant 104-1 has exited the first vehicle 102-1.

In particular, in FIG. 4, as the first occupant 104-1 has exited the first vehicle 102-1, the controller 218 and/or the computing device 200 of the first vehicle 102-1 determines (e.g. at an "Occupant Exited" decision at the block 302), that the first occupant 104-1 has exited the first vehicle 102-1.

However, it is further understood in FIG. 5 that, as the first occupant 104-1 has exited the first vehicle 102-1, the controller 218 and/or the computing device 200 of the second vehicle 102-2 (e.g. also implementing the method 300) has also determined (e.g. at an "Occupant Exited" decision at the block 302), that the first occupant 104-1 has exited the first vehicle 102-1.

As such, in particular depicted examples, a respective computing device 200 of the first vehicle 102-1 may control the first vehicle display 108-1 to provide a notification 401 that the first vehicle display 108-1 is being placed in an exited occupant support mode (e.g., as depicted, via text "Entering Exited Occupant Support Mode").

Similarly, the respective computing device 200 of the first vehicle 102-1 may control the first mobile display 112-1 to provide a notification 402 that the first vehicle display 108-1 is being placed in an exited occupant support mode (e.g., as depicted, via text "Entering Exited Occupant Support Mode").

Similarly, a respective computing device 200 of the second vehicle 102-2 may control the second vehicle display 108-2 to provide a notification 403 that the second vehicle display 108-2 is being placed in an exited occupant support mode (e.g., as depicted, via text "Entering Exited Occupant Support Mode").

Similarly, the respective computing device 200 of the second vehicle 102-2 may control the second mobile display 112-2 to provide a notification 404 that the second vehicle display 108-2 is being placed in a exited occupant support mode (e.g., as depicted, via text "Entering Exited Occupant Support Mode").

While not depicted, the notifications 401, 402, 403, 404 may be provided with one or more electronic buttons, and the like, to accordingly accept or reject being placed into an exited occupant support mode, and the like. In these examples, an occupant 104, 106 of a vehicle 102 may actuate a suitable electronic button to cause respective displays 108, 112 to accordingly enter the exited occupant support modes. Alternatively, or in addition, after the notifications 401, 402, 403, 404 are provided for a given time period (e.g., 1 second, 2 seconds 5 seconds, amongst other possibilities), respective displays 108, 112 may be accordingly selectively controlled from a normal mode into the exited occupant support mode, as is next described with respect to FIG. 5. However, when an occupant 104, 106 of a vehicle 102 actuates a suitable electronic button to reject entering the exited occupant support mode, respective displays 108, 112 may remain in the normal mode.

As also depicted in FIG. 4, the exited occupant 104-1 is wearing a BWC 405 and/or a biometric monitor 406 (e.g. a heartrate monitor), and the BWC 405 and the biometric monitor 406 are understood to be respectively streaming video of the incident scene 114, and vital signs of the exited occupant 104-1 (e.g. heartrate) to one or more of the cloud server 116, the first vehicle 102-1 and the second vehicle 102-2. While not depicted, the exited occupant 104-1 may also be wearing a mobile device that includes a location determining device streaming a location of the exited occupant 104-1 to one or more of the cloud server 116, the first vehicle 102-1 and the second vehicle 102-2 (and/or the BWC 405 and/or the biometric monitor 406 may include a location determining device streaming the location in such a manner).

In FIG. 4, it is further understood that the drone 118 has been launched, is hovering over the incident scene 114 and is streaming video of the incident scene 114 (e.g., from the camera 120) to one or more of the cloud server 116, the first vehicle 102-1 and the second vehicle 102-2.

Furthermore, in the depicted example, the incident scene 114 may comprise a traffic stop. Hence, while for simplicity, the incident scene 114 continues to be shown generically as a star in FIG. 4, it is understood that the incident scene 114 may comprise a vehicle and a driver who may have exited the vehicle of the incident scene 114 as described hereafter. Indeed, such a vehicle and driver will be described with respect to video streamed from the BWC 405 and the drone 118.

Attention is next directed to FIG. 5, which is understood to follow from FIG. 4. Similar to FIG. 4, in FIG. 5 it is understood that the first occupant 104-1 has exited the first vehicle 102-1, and the controller 218 and/or the computing device 200 of the first vehicle 102-1 responsively selectively enables an exited occupant support mode at the first vehicle display 108-1 and the first mobile display 112-1.

Similarly, the controller 218 and/or the computing device 200 of the second vehicle 102-2 responsively selectively enables an exited occupant support mode at the second vehicle display 108-2 and the second mobile display 112-2.

With attention first directed to the first vehicle display 108-1 of the first vehicle 102-1, while the LPR application of the first application 131 remains enabled, a third application 233 has been selectively enabled at the first vehicle display 108-1, and comprises a BWC output application. For example, at the first vehicle display 108-1, the BWC output application includes a window 504 showing video streamed from the BWC 405; as such the video of the window 504 shows a vehicle of the traffic stop of the incident scene 114 and a driver that exited the vehicle. The video streamed from the BWC 405 may be received at the first vehicle 102-1 via the cloud server 116 via the network 101, and/or the transceiver 208 associated with the first vehicle 102-1; in some specific examples, the BWC 405 may communicate directly with the transceiver 208 associated with the first vehicle 102-1 via a local communication link.

With attention next directed to the first mobile display 112-1 of the first mobile device 110-1, while the LPR application of the first application 131 remains enabled, two fourth applications 234 have been selectively enabled at the first mobile display 112-1 (e.g. at the block 304 of the method 300). For example, the fourth applications 234 include a BWC output application that includes a window 506 showing streamed video from the BWC 405, similar to the window 504, and the fourth applications 234 include a vital sign application that shows a heart rate (e.g. "100 bpm") of the exited occupant 104-1 (e.g. "Officer Jones") as received from the biometric monitor 406. The biometric data streamed from biometric monitor 406 may be received at the first vehicle 102-1 via the cloud server 116 via the network 101, and/or the transceiver 208 associated with the first vehicle 102-1; in some specific examples, the biometric monitor 406 may communicate directly with the transceiver 208 associated with the first vehicle 102-1 via a local communication link.

With attention next directed to the second vehicle display 108-2 of the second vehicle 102-2, respective third applications 233 have been selectively enabled at the second vehicle display 108-2, and have replaced the LPR output application of the first application 131. The respective third applications 233 selectively enabled at the second vehicle display 108-2 include a drone output application and a transcript application. The drone output application of the respective third applications 233 includes a window 508 showing video streamed from the drone 118; as such the video of the window 508 shows the vehicle of the traffic stop of the incident scene 114 and the driver that exited the vehicle from the point-of-view of the drone 118 (e.g., overhead), as well as the exited occupant 104-1 (e.g., also from overhead).

The transcript application of the respective third applications 233 includes text of prior audio of the streamed video of the BWC 405 and/or the BWC output application of the third application 233 enabled at the first vehicle display 108-1 and the first mobile display 112-1. For example, the transcript application may receive the streamed video from the BWC 405 (e.g. and/or the first vehicle 102-1 and/or the first mobile device 110-1), and convert the audio of the streamed video into text, that is provided at the second vehicle display 108-2 of the second vehicle 102-2.

Alternatively, and/or in addition, such text may be generated by the cloud server 116 (e.g. and/or the first vehicle 102-1 and/or the first mobile device 110-1) and downloaded by the transcript application.

As depicted, such text includes text of audio acquired by the BWC 405 prior to the exited occupant support mode being enabled (e.g., and labeled "Prior Audio of BWC of O1", where "O1" indicates "Officer 1", the exited occupant 104-1 that exited the first vehicle 102-1). For example such text of audio acquired prior to the exited occupant support mode being enabled indicates that the exited occupant 104-1 (e.g., "O1") asked the driver of the vehicle at the traffic stop to exit his vehicle (e.g., "Sir, exit the vehicle"), the driver (e.g., "Suspect") replied he would do that (e.g., "Sure, will do"), and the exited occupant 104-1 subsequently asked the driver to keep this hands visible (e.g., "Keep hands visible please"). Such text further includes live audio being currently acquired by the BWC 405 (e.g., and labeled "Live Audio"), and includes the driver of the vehicle at the traffic stop agreeing to keep his hands visible (e.g., "Yes Officer").

With attention next directed to the second mobile display 112-2 of the second mobile device 110-2, respective fourth applications 234 selectively enabled at the second mobile display 112-2 include a drone control application, and an on-scene application. The drone control application of the respective fourth applications 234 may include controls to control throttle, pitch, yaw and roll of the drone and zoom of the drone camera 120. In some examples, the drone interface of the fourth applications 234 may be provided at the mobile display 112-2 of the subsequent vehicle 102-2 only after a computing device 200 of the first vehicle 102-1 and/or the mobile device 110-1 is queried to determine that the first vehicle 102-1 is not providing a drone interface (which may be controlled by the second occupant 106-1 that remains in the first vehicle 102-1). Put another way, computing devices 200 of the vehicles 102 and/or the mobile devices 110 may communicate to ensure that only one of the vehicles and/or mobile devices 110 is controlling the drone 118.

The on-scene application of the respective fourth applications 234 includes a location of the exited occupant 104-1 (e.g. received from a location determining device worn by the exited occupant 104-1), the location provided relative to a task of the exited occupant 104-1 (e.g. "Conducting Traffic Stop").

Hence, any of the applications 233, 234 may assist the remaining occupants 104-2, 106 in providing support for the exited occupant 104-1.

However, the applications 233, 234 may include any other suitable information, which may include, but is not limited to, a map and/or locations of the occupants of the vehicles 102 (e.g. determined from worn mobile devices, such as the BWC 405, the biometric monitor 406 and the like), tasks associated with the occupants of the vehicles 102 (e.g., which may be accessed via an incident report associated with the incident scene 114), and the like, video from closed circuit cameras at or near the incident scene 114 (e.g., and the cloud server 116 may have access to video from such one or more closed circuit cameras), information from biometric, or other sensors, associated with occupants of the vehicles 102 (e.g. such as the biometric monitor 406), floorplans of buildings at or near the incident scene 114 (e.g. as provided by the cloud server 116, and which may include, ingress/egress points, evacuation status, and the like of floors of the buildings), and the like.

In some examples, the applications 233, 234 may include a form application, for example for filling in a form that may be added to an incident report for the incident of the incident scene 114, and the like. Such a form may be at least partially populated based on contextual information available to one or more computing devices of the vehicles 102 and/or the cloud server 116, such as a type of the incident, identifiers of occupants 104, 106 and/or vehicles 102 present and/or dispatched to the incident, and the like, information from an LPR, and the like, amongst other possibilities. The form of the form application may be further filled in via an occupant 104, 106 interacting with the form application, for example to add observations, and the like of an occupant 104, 106.

Furthermore, while not depicted, the applications 233, 234 may include any other suitable functionality. For example, one or more of the applications 233, 234 may include one or more electronic buttons for causing one or more respective windows provided at displays 108, 112 associated with one vehicle 102 to be provided at displays 108, 112 associated with the other vehicle 102. For example, one or more of the applications 233, 234 implemented in association with the first vehicle 102-1 may include one or more electronic buttons that, when actuated cause one or more of the window 504, 506 to be provided at one or more the respective displays 108-2, 112-2 associated with the second vehicle 102-2 (e.g. via the direct V2V wireless communication link 113). Similarly, one or more of the applications 233, 234 implemented in association with the second vehicle 102-2 may include one or more electronic buttons that, when actuated cause the window 508 to be provided at the one or more of the respective displays 108-1, 112-1 associated with the first vehicle 102-1 (e.g. via the direct V2V wireless communication link 113).

Alternatively, or in addition, actuation of such electronic buttons may cause options to be provide at a display 108, 112 of a vehicle 102, to which a window is to be provided, for accepting or rejecting providing of the window thereupon. Hence, in these examples, a controller 218 of the first vehicle 102 may be generally configured to: receive input in the exited occupant support mode; and communicate, via the transceiver 208 and/or the communication interface 202, with the second vehicle 102-2 proximal to the first vehicle 102-1 to cause a respective controller of the second vehicle 102-2 to update one or more respective displays 108, 112 based on the input.

Furthermore, the applications 233, 234 implemented at least at the second vehicle display 108-2 and/or the second mobile display 112-2 may depend on whether or not there is a remaining occupant 104, 106 in the first vehicle 102-1. For example, when there is no remaining occupant 104, 106 in the first vehicle 102-1, the first vehicle display 108-1 and/or the first mobile display 112-1 may be placed into an energy saving mode (e.g. blanked out and/or turned off), and the window 504 and/or the window 506 showing video streamed from the BWC 405 may be respectively provided at the second vehicle display 108-2 and/or the second mobile display 112-2, as may any information provided via one or more of the applications 131, 132.

In some further very particular examples, all the applications 131, 132, 233, 234 may be similar and/or of the same type, but selectively controlled to provide different information content in a first vehicle support mode or a subsequent vehicle support mode. Put another way, a single application, such as the application 222 may comprise all the applications 131, 132, 233, 234, and/or functionality thereof, and the single application may be operated in different modes as described herein.

While particular examples of the applications 131, 132, 233, 234 are described with respect to the traffic stop of FIG. 5, other applications 131, 132, 233, 234 for a traffic stop are within the scope of the present specification.

For example. Table 1 provides different examples of applications 133, 134, 233, 234 for a traffic stop (e.g. before and after the occupant 104-1, such as an officer, exits the first vehicle 102-1, and with/without at least one remaining occupant 104, 106 in the first vehicle 102-1):

TABLE 1

| Traffic Stop Application Examples | |
|---|---|
| Application 131 (Before Exit) (First Vehicle Display 108-1) LPR results Driver information | Application 132 (Before Exit) (First Mobile Display 112-1) An expanded version of: LPR results; and/or driver information Incident list Map View of Incidents, and the like |
| Application 233 (After Exit) (Assuming At Least One Remaining Occupant 104, 106 In The First Vehicle 102-1) (First Vehicle Display 108-1 or Second/ Proximal Vehicle Display 108-2) Exited officer(s)' BWC video when out of vehicle Transcription of audio (ambient and/or BWC) from exited officer(s) An expanded version of: exited officer's BWC info; driver information, etc. | Application 234 (After Exit) (Assuming At Least One Remaining Occupant 104, 106 In The First Vehicle 102-1) (First Mobile Display 112-1 or Second/ Proximal Vehicle Display 112-2) An expanded version of: drone information; exited officer's BWC video/info; and/or other available transcripts available, etc. Drone control Exited officer BWC selection list Incident list Map view of Incidents. |

TABLE 1-continued

| Traffic Stop Application Examples |
| --- |
| Incident list and the like |
| Map View of Incidents, and the like |
| Drone video of stopped vehicle (e.g., optionally, only when vehicle stopped) |
| Applications 233, 234 (After Exit) |
| (Assuming No Remaining Occupant 104, 106 In The First Vehicle 102-1) |
| Displays 108-1, 112-1 of First Vehicle 102-1: placed into energy saving mode |
| Displays 108-2, 112-2 of Second Vehicle 102-2 (distributed in any suitable manner): |
| Exited officer(s)' BWC when out of vehicle and/or dashcam video of first vehicle |
| Transcription of audio (ambient and/or BWC) from exited officer(s) |
| Incident list |
| Map View of Incidents, and the like |
| Drone control/video of stopped vehicle (e.g., only when the vehicle stopped) |
| Form fill relating to incident (e.g. partially completed with contextual information) |

Furthermore, the applications 131, 132, 233, 234 may be selected based on a type of incident. For example. Table 2 provides different examples of applications 13, 132, 233, 234 for an emergency medical technician (EMT) 911 dispatch to a location:

TABLE 2

| EMT 911 Dispatch Application Examples | |
| --- | --- |
| Application 131 (Before Exit) (First Vehicle Display 108-1) Address/buisness lookup/results 911 Call Transcript Medical information re: patient: blood type, prescriptions, presence of pacemaker (e.g. via a database lookup once patient is identified | Application 132 (Before Exit) (First Mobile Display 112-1) Expanded version: of address/buisness lookup/results; medical information 911 Call Transcript |
| Application 233 (After Exit) (Assuming At Least One Remaining Occupant 104, 106 In The First Vehicle 102-1) (First Vehicle Display 108-1 or Second/Proximal Vehicle Display 108-2) Exiting EMT's BWC video Transcription of audio (ambient and/or BWC) from exited EMT Real time medical information/updates re: patient (vitals) when available Drone video Map View (with triage information overlaid) | Application 234 (After Exit) (Assuming At Least One Remaining Occupant 104, 106 In The First Vehicle 102-1) (First Mobile Display 112-1 Second/Proximal Vehicle Display 112-2) An expanded version of: medical information; BWC video and/or 911 transcripts; and/or other available transcripts available, etc. Incident list Drone Control Map View Controls (e.g. control of triage information) Drone Control |
| Applications 233, 234 (After Exit) (Assuming No Remaining Occupant 104, 106 In The First Vehicle 102-1) Displays 108-1, 112-1 of First Vehicle 102-1: placed into energy saving mode Displays 108-2, 112-2 of Second Vehicle 102-2 (distributed in any suitable manner). Exited EMT(s)' BWC when out of vehicle and/or dashcam video of first vehicle Transcription of audio (ambient and/or BWC) from exited EMT(s) Incident list Map View of Incidents, and the like Drone control/video of stopped vehicle (e.g., only when the vehicle stopped) Form fill relating to incident (e.g. partially completed with contextual information) | |

In another example. Table 3 provides different examples of applications 131, 132, 233, 234 for a 911 fire dispatch (e.g. for firefighters (FFs) to a location:

TABLE 3

| Fire 911 Dispatch Application Examples | |
| --- | --- |
| Application 131 (Before Exit) (First Vehicle Display 108-1) Address/buisness lookup/results 911 Call Transcript Fire hydrant locations | Application 132 (Before Exit) (First Mobile Display 112-1) Expanded version of address/buisness lookup/results 911 Call Transcripts Map of fire hydrant locations |
| Application 233 (After Exit) (Assuming At Least One Remaining Occupant 104, 106 In The First Vehicle 102-1) (First Vehicle Display 108-1 or Second/Proximal Vehicle Display 108-2) Exiting FF' BWC video Transcription of audio (ambient and/or BWC) from exited FF Drone video Map View (e.g. incidents, fire hydrant locations, locations assigned to FFs (e.g. self-assign capability and/or actionable by 911 center, etc.) Locations (internal or external) and/or Floorplans: Locations of ingress/egress points, etc.; those covered/evacuated and those not yet covered/evacuated by FFs | Application 234 (After Exit) (Assuming At Least One Remaining Occupant 104, 106 In The First Vehicle 102-1) (First Mobile Display 112-1 or Second/Proximal Mobile Display 112-2) Expanded version of address/business lookup/results 911 Call Transcript Map of fire hydrant locations Incident list Drone Control Map View Controls (e.g. control of triage information at fire location) Drone Control |
| Applications 233, 234 (After Exit) (Assuming Bo Remaining Occupant 104, 106 In The First Vehicle 102-1) Displays 108-1, 112-1 of First Vehicle 102-1: placed into energy saving mode Displays 108-2, 112-2 of Second Vehicle 102-2 (distributed in any suitable manner): Exited FF(s)'s BWC when out of vehicle and/or dashcam video of first vehicle Transcription of audio (ambient and/or BWC) from exited FF(s) Incident list Map View of Incidents, and the like Locations (internal or external) and/or Floorplans: Locations of ingress/egress points, etc.; those covered/evacuated by FFs Drone control/video of stopped vehicle (e.g., only when the vehicle stopped) Form fill relating to incident (e.g. partially completed with contextual information) | |

While Table 1, Table 2, and Table 3 have been described with respect to the applications 131, 132, 233, 234, it is understood that the types of information described in Table 1, Table 2, and Table 3 may be provided in one or more same applications, operating in an exited occupant support mode or another mode (e.g. prior to the exited occupant support mode.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control displays, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

Furthermore, descriptions of one processor and/or controller and/or device and/or engine, and the like, configured to perform certain functionality is understood to include, but is not limited to, more than one processor and/or more than one controller and/or more than one device and/or more than one engine, and the like performing such functionality.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
a vehicle egress sensor;
a first vehicle comprising: a vehicle display; and
a mobile device comprising: a mobile display, the first vehicle and the mobile device communicatively coupled to each other; and
at least one controller configured to:
determine, via the vehicle egress sensor, that an occupant has exited the first vehicle, or a second vehicle proximal to the first vehicle;
in response, selectively enable an exited occupant support mode at one or more of the vehicle display and the mobile display,
prior to enabling the exited occupant support mode, selectively launch: a first application for presentation at the vehicle display; and a second application for presentation at the mobile display; and
after enabling the exited occupant support mode, selectively launch one or more of:
a third application for presentation at the vehicle display, the third application for supporting the occupant that exited the first vehicle or the second vehicle; and
a fourth application for presentation at the mobile display, the fourth application for supporting the occupant that exited the first vehicle or the second vehicle.

2. The system of claim 1, wherein the at least one controller comprises one or more of:
an In-Car Processor (ICP) of the first vehicle; and
a mobile processor of the mobile device.

3. The system of claim 1, wherein the vehicle egress sensor comprises one or more of:
a door sensor of the first vehicle or the second vehicle;
a seat sensor of the first vehicle or the second vehicle;
a video camera;
a location sensor configured to sense a location of the occupant that exited the first vehicle or the second vehicle;
a presence sensor; and
an occupant-vehicle communication device.

4. The system of claim 1, wherein the at least one controller is further configured to:
prior to enabling the exited occupant support mode, selectively launch: the first application for presentation at the vehicle display in a first mode; and the second application for presentation at the mobile display in a respective first mode; and
after enabling the exited occupant support mode, one or more of:
change the first application from the first mode to a second mode for supporting the occupant that exited the first vehicle or the second vehicle; and
change the second application from the respective first mode to a respective second mode for supporting the occupant that exited the first vehicle or the second vehicle.

5. The system of claim 1, wherein, prior to determining that that the occupant has exited the first vehicle, or the second vehicle proximal to the first vehicle, one or more of the vehicle display and the mobile display is in a mode other than the exited occupant support mode.

6. The system of claim 1, wherein the at least one controller is further configured to, in the exited occupant support mode:
provide sensor data associated with a respective mobile device of the occupant that exited the first vehicle or the second vehicle at one or more of the third application and the fourth application.

7. The system of claim 1, wherein the at least one controller is further configured to, in the exited occupant support mode;
combine sensor data comprising one or more of: real-time or historical post-occupant-exit audio or video; streamed text associated with the respective mobile device of the occupant that exited the first vehicle or the second vehicle; and real-time or historical post-occupant-contextual information including location of the occupant that exited the first vehicle or the second vehicle, displayed relative to tasks or incidents associated with the occupant that exited the first vehicle or the second vehicle; and
provide different respective sets of such combined sensor data at the third application and the fourth application.

8. The system of claim 1, wherein the at least one controller is further configured to, in the exited occupant support mode;
provide sensor data received from a respective mobile device of the occupant that exited the first vehicle or the second vehicle at one or more of the third application and the fourth application.

9. The system of claim 1, wherein the at least one controller is further configured to, in the exited occupant support mode:
provide sensor data received from a cloud server in communication with a respective mobile device of the occupant that exited the first vehicle or the second vehicle at one or more of the third application and the fourth application.

10. The system of claim 1, wherein the at least one controller is further configured to:
combine a first set of sensor data associated with the occupant that exited the first vehicle or the second vehicle; and provide the first set of sensor data at the third application; and
combine a second set of sensor data associated with the occupant that exited the first vehicle or the second vehicle, the second set different from the first set; and provide the first set of sensor data at the fourth application.

11. The system of claim 1, wherein the at least one controller is further configured to:
provide, at one of the third application and the fourth application, one or more controls for controlling a remote device launched to assist the occupant that exited the first vehicle or the second vehicle; and
provide, at the other of the third application and the fourth application, sensor data associated with the occupant that exited the first vehicle or the second vehicle.

12. A method comprising:
determining, at a computing device, via a vehicle egress sensor, that an occupant has exited a first vehicle, or a second vehicle proximal to the first vehicle; the first vehicle comprising: a vehicle display; and a mobile device comprising: a mobile display, the first vehicle and the mobile device communicatively coupled to each other;
in response, selectively enabling, via the computing device, an exited occupant support mode at one or more of the vehicle display and the mobile display,
prior to enabling the exited occupant support mode, selectively launching: a first application for presentation at the vehicle display; and a second application for presentation at the mobile display; and
after enabling the exited occupant support mode, selectively launching one or more of:
a third application for presentation at the vehicle display, the third application for supporting the occupant that exited the first vehicle or the second vehicle; and
a fourth application for presentation at the mobile display, the fourth application for supporting the occupant that exited the first vehicle or the second vehicle.

13. The method of claim 12, further comprising:
prior to enabling the exited occupant support mode, selectively launching: the first application for presentation at the vehicle display in a first mode; and the second application for presentation at the mobile display in a respective first mode; and
after enabling the exited occupant support mode, one or more of:
changing the first application from the first mode to a second mode for supporting the occupant that exited the first vehicle or the second vehicle; and
changing the second application from the respective first mode to a respective second mode for supporting the occupant that exited the first vehicle or the second vehicle.

14. The method of claim 12, wherein, prior to determining that that the occupant has exited the first vehicle, or the second vehicle proximal to the first vehicle, one or more of the vehicle display and the mobile display is in a mode other than the exited occupant support mode.

15. The method of claim 12, further comprising, in the exited occupant support mode:
providing sensor data associated with a respective mobile device of the occupant that exited the first vehicle or the second vehicle at one or more of the third application and the fourth application.

16. The method of claim 12, further comprising, in the exited occupant support mode:
combining sensor data comprising one or more of: real-time or historical post-occupant-exit audio or video; streamed text associated with the respective mobile device of the occupant that exited the first vehicle or the second vehicle; and real-time or historical post-occupant-contextual information including location of the occupant that exited the first vehicle or the second vehicle, displayed relative to tasks or incidents associated with the occupant that exited the first vehicle or the second vehicle; and
providing different respective sets of such combined sensor data at the third application and the fourth application.

17. The method of claim 12, further comprising, in the exited occupant support mode:
providing sensor data received from a respective mobile device of the occupant that exited the first vehicle or the second vehicle at one or more of the third application and the fourth application.

18. The method of claim 12, further comprising, in the exited occupant support mode:
providing sensor data received from a cloud server in communication with a respective mobile device of the occupant that exited the first vehicle or the second vehicle at one or more of the third application and the fourth application.

19. The method of claim 12, further comprising:
combining a first set of sensor data associated with the occupant that exited the first vehicle or the second vehicle; and providing the first set of sensor data at the third application; and
combining a second set of sensor data associated with the occupant that exited the first vehicle or the second vehicle, the second set different from the first set; and providing the first set of sensor data at the fourth application.

20. The method of claim 12, further comprising:
providing, at one of the third application and the fourth application, one or more controls for controlling a remote device launched to assist the occupant that exited the first vehicle or the second vehicle; and
providing, at the other of the third application and the fourth application, sensor data associated with the occupant that exited the first vehicle or the second vehicle.

* * * * *